US006808238B2

United States Patent
Drott et al.

(10) Patent No.: US 6,808,238 B2
(45) Date of Patent: Oct. 26, 2004

(54) OPERATING UNIT FOR AN ELECTROHYDRAULIC BRAKING SYSTEM

(75) Inventors: Peter Drott, Frankfurt/Main (DE); Horst Krämer, Ginsheim-Gustavsburg (DE); Jan Hoffmann, Rochester Hills, MI (US); Holger Kranlich, Karben (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/240,118

(22) PCT Filed: Mar. 23, 2001

(86) PCT No.: PCT/EP01/03356

§ 371 (c)(1),
(2), (4) Date: Sep. 27, 2002

(87) PCT Pub. No.: WO01/72566

PCT Pub. Date: Oct. 4, 2001

(65) Prior Publication Data

US 2003/0098611 A1 May 29, 2003

(30) Foreign Application Priority Data

| Mar. 27, 2000 | (DE) | 100 15 232 |
| Mar. 27, 2000 | (DE) | 100 15 231 |
| Aug. 11, 2000 | (DE) | 100 39 238 |

(51) Int. Cl.$^7$ ............... B60T 13/66; B60T 8/40; B60T 11/20; B60T 7/04
(52) U.S. Cl. ............... 303/114.1; 303/113.4; 188/358
(58) Field of Search ............... 303/114.1, 114.2, 303/113.1, 115.1, 87, DIG. 1, DIG. 2, 113.4; 188/358, 359, 151 A; 60/566, 591, 582, 592, 562, 594

(56) References Cited

U.S. PATENT DOCUMENTS 5,544,948 A  8/1996  Schmidt et al.
6,033,036 A  3/2000  Rüffer et al.
6,192,685 B1 * 2/2001  Bourlon et al. ............... 60/566

FOREIGN PATENT DOCUMENTS

| DE | 195 43 582 | 6/1997 |
| DE | 196 26 926 | 1/1998 |
| DE | 196 32 035 | 2/1998 |
| DE | 196 40 767 | 4/1998 |
| DE | 197 57 996 | 9/1998 |
| DE | 198 22 411 | 8/1999 |
| WO | 9932337 | 7/1999 |

OTHER PUBLICATIONS

Translations of submitted DE19822411 and DE19632035.*

Search Report for German Patent Appln 10039238.5.

* cited by examiner

Primary Examiner—Douglas C. Butler
(74) Attorney, Agent, or Firm—Honigman, Miller, Schwartz and Cohn LLP

(57) ABSTRACT

The present invention relates to an operating unit for an electrohydraulic braking system of the 'brake-by-wire' type, which is designed as a tandem master cylinder having a first and a second piston biased by each one resetting spring in opposition to the actuating direction. The first pressure chamber of the tandem master cylinder is connected to a hydraulic chamber defined by a simulator element. The simulator element also defines a simulator chamber accommodating a simulator spring and connected to a pressure fluid supply reservoir. A valve device is provided which closes or opens the hydraulic connection between the simulator chamber and the pressure fluid supply reservoir. To disclose an operating unit that permits being manufactured at low costs and allows easy bleeding, according to the present invention, the simulator element is formed of a hydraulic simulator piston and the valve device is provided by a seal arranged at the second piston and by the mouth area of a channel designed in the range of movement of the seal, the said channel forming the hydraulic connection.

16 Claims, 4 Drawing Sheets

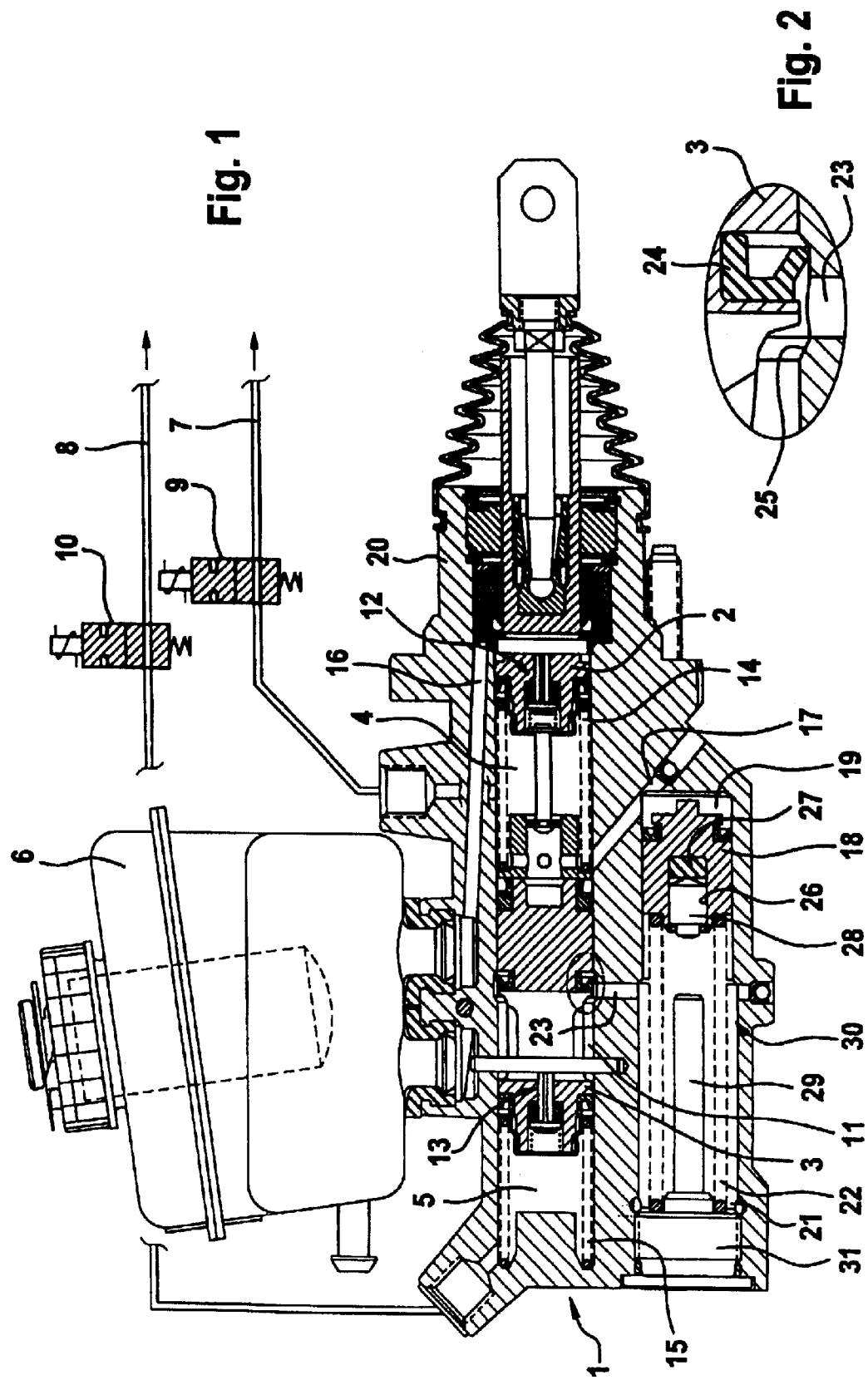

US 6,808,238 B2

OPERATING UNIT FOR AN ELECTROHYDRAULIC BRAKING SYSTEM

TECHNICAL FIELD

The present invention generally relates to brake systems and more particularly relates to an operating unit for an electrohydraulic braking system of the 'brake-by-wire' type.

BACKGROUND OF THE INVENTION

An operating unit of this general type is disclosed in DE 198 22 411 A1. The characteristic feature of the prior-art operating unit involves that the simulator element is formed of a metal pleated bellows that accommodates the simulator spring without preload. The above-mentioned third valve device which is arranged in the connection between the interior of the pleated bellows and the supply chamber of the second pressure chamber is comprised of a seat valve that is mechanically operable by the movement of the second piston by means of a two-arm tilting lever mounted on an axis of rotation. The prior-art operating unit especially suffers from the disadvantage of the complicated design of the actuation of the third valve device causing considerable costs of manufacture and assembly. The bleeding of the interior of the pleated bellows is also considered as a problem.

BRIEF SUMMARY OF THE INVENTION

In view of the above, an object of the present invention is to disclose an operating unit of the above-mentioned type that permits being manufactured at low costs and allows easy bleeding.

According to the present invention, this object is achieved in that the simulator element is formed of a (simulator) piston that can be acted upon by the pressure introduced in the first pressure chamber, and in that the third valve device is formed of a seal arranged at the second piston and by the mouth area of a channel provided in the range of movement of the seal and constituting the second hydraulic connection. These provisions allow deactivating the simulator effect within the emergency operation, where minimum possible lost travels are realized until the first pressure buildup in the vehicle wheel brakes.

A second solution of the present invention to the object to be achieved includes that in an operating unit where a second hydraulic connection between the simulator chamber and the pressure fluid supply reservoir is obviated, the simulator element is formed of a hydraulic simulator piston, and that the third valve device is formed of a seal arranged at the second piston and by the mouth area of a channel provided in the range of movement of the seal, the said channel constituting the hydraulic connection and being connected to the first pressure chamber, on the one hand, and to a hydraulic chamber separated from the simulator chamber by the simulator piston, on the other hand.

In another favorable embodiment of the second solution, a second hydraulic connection may be provided between the simulator chamber and the pressure fluid supply reservoir.

Another favorable aspect of the present invention arranges for hydraulic resistors or throttling means, respectively, in the hydraulic connection or in the second hydraulic connection. The mentioned provisions achieve an effective damping during actuation of the simulator.

In a third and a fourth solution to the above-mentioned object, the simulator element is formed of a hydraulic simulator piston in operating units wherein the third valve device closes or opens the first or the second hydraulic connection and is configured as a seat valve and includes a valve member that is biased in its closing direction by a spring, and the third valve device is operable by means of a transverse member axially abutting on the second piston. The above-mentioned fourth solution is especially appropriate for an actuating unit where there is no second hydraulic connection between the simulator chamber and the pressure fluid supply reservoir.

Favorable aspects of the present invention can be taken from sub claims 11 to 16.

It is considered advantageous to use a travel sensor signal for detecting the driver's request. The travel sensor signal is output by a travel measuring system integrated in the housing in another embodiment of the subject matter of this invention, wherein the first piston is configured as a component of the measuring system that senses the actuating travel.

In a travel measuring system that functions very reliably, signal generator elements of the travel measuring system are mounted on the cylindrical surface of the first piston, and the signal pickups of the system are arranged in the housing.

BRIEF DESCRIPTION OF THE DRAWINGS

FIG. 1 is an axial cross-sectional view of a first design of the operating unit of the present invention.

FIG. 2 is an enlarged view of a detail of the design shown in FIG. 1.

DETAILED DESCRIPTION OF THE PREFERRED EMBODIMENTS

Figure 3:
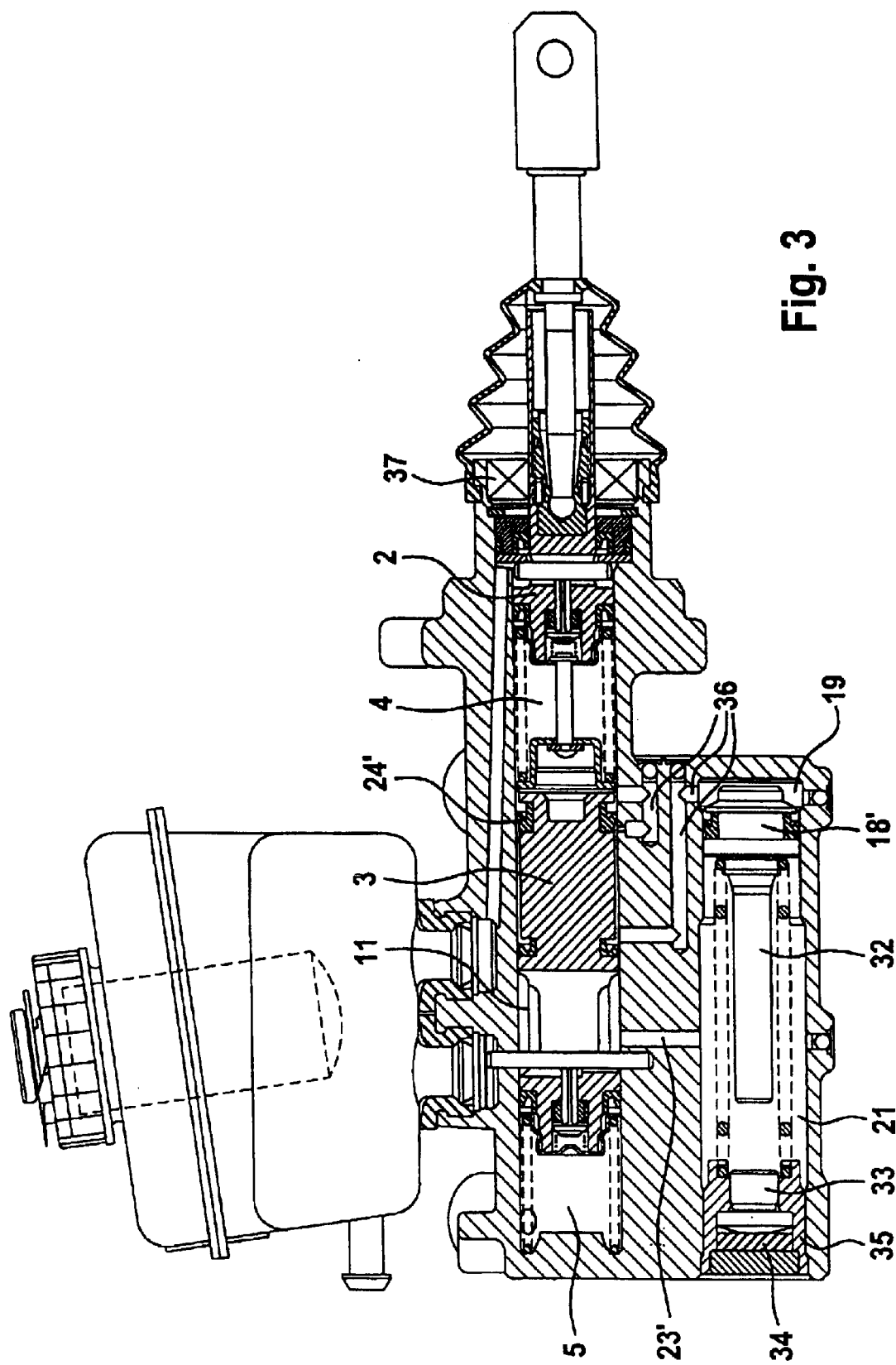
FIG. 3 is an illustration corresponding to FIG. 1 of a second design of the operating unit of the present invention.

The operating unit illustrated in FIG. 1 is essentially composed of a dual-circuit pressure generator or, respectively, tandem master cylinder 1, that is operable by means of an actuating pedal (not shown), as well as a simulator 30 that cooperates with the master brake cylinder 1. A master brake cylinder housing 20 contains in a bore pressure chambers 4, 5 isolated from one another and defined by two pistons 2, 3, the said pressure chambers being in connection with a non-pressurized pressure fluid supply reservoir 6. Hydraulic wheel brakes (not shown) associated with the vehicle axles are connected to the two pressure chambers (primary pressure chamber 4, secondary pressure chamber 5) by means of closable hydraulic connections 7, 8 (shown only schematically). Electromagnetically operable, normally open (NO) two-way/two-position directional control valves, for example, close the hydraulic connections 7, 8. While the first pressure chamber 4, by the intermediary of a first central valve 12 arranged in the first piston 2, is in connection to the pressure fluid supply reservoir 6 by means of a pressure fluid channel 16, the second piston 3 in the master brake cylinder housing 20 defines a supply chamber 11 which is connected to the associated pressure chamber 5 by way of a second central valve 13 arranged in the second piston 3, on the one hand, and to the pressure fluid supply reservoir 6 by way of a pressure fluid channel (not shown) provided in the master cylinder housing 20, on the other hand.

As can further be taken from FIG. 1, a first and a second resetting spring 14, 15 is arranged in the mentioned pressure chambers 4, 5 biasing the pistons 2, 3 in opposition to their direction of actuation or, respectively, maintaining them in their initial position. Connected to the first chamber, i.e., the primary pressure chamber 4, by way of a hydraulic connection 17 is a hydraulic chamber 19 that is defined by a hydraulic piston, i.e., simulator piston 18. Simulator piston 18 which also defines a simulator chamber 21, forms along with a simulator spring 22 arranged in simulator chamber 21 a pedal simulator which has been assigned reference numeral 30 and imparts the usual pedal feeling to the driver of the vehicle when the pressure chambers 4, 5 are closed. The simulator spring 22 determines the variation of the pedal characteristics, i.e., the dependency of the pedal force on the actuating travel.

To permit a relative movement of the first piston 2 with respect to the housing 20 when the pressure chambers 4, 5 are closed, the result of said movement being that the pressure fluid volume displaced from the first pressure chamber 4 is applied to the hydraulic chamber 19, a hydraulic connection 23 is provided between the simulator chamber 21 and the above-mentioned supply chamber 11 or the pressure fluid supply reservoir 6, respectively, which connection must be interrupted or closed in the case of an emergency braking operation. In the example shown in FIG. 1, the said hydraulic connection 23 is configured as a bore or a channel having a seal, i.e., sealing sleeve 24 (see in particular FIG. 2) arranged at the second piston 3 at the channel's mouth area in the supply chamber 11. The mouth area of the channel 23 along with the sealing sleeve 24 forms a third valve device. The described arrangement permits propagation of the pressure fluid out of the first pressure chamber past the (immovable) sealing sleeve 24 into the pressure fluid supply reservoir 6, with the second pressure chamber 5 closed. In contrast thereto, the two pistons 2, 3 are displaced in an emergency braking operation where the above-mentioned shut-off valves 9, 10 remain open so that the sealing sleeve 24 arranged at the second piston 3 will override the mouth of the channel 23 and interrupt the connection between the first pressure chamber 4 or the simulator chamber 21, respectively, and the pressure fluid supply reservoir 6, with the result that the pedal simulator is unable to take up pressure fluid volume and hydraulic pressure can develop in the two pressure chambers 4, 5.

It becomes apparent from the above-mentioned FIG. 2 that the hydraulic connection 23 opens into an annular groove 25 being sized so that the sealing sleeve 24 is mounted without tension in a radial direction in the condition shown. This eliminates in the 'brake-by-wire' mode both the friction forces as a disturbance variable in the force-travel characteristic curve and the wear of the sealing sleeve.

As becomes clear from FIG. 1, the simulator piston 18 includes a blind-end bore 26 that accommodates an elastic element 27, for example, a rubber-elastic disc, as well as a pressure member 28 that axially abuts on the elastic element 27. Opposite the pressure member 28 in the simulator chamber 21 is a cylindrical extension 29 of a closure member 31 that closes the simulator chamber 21 and against which the pressure member 28 will come to bear in the event of an excessive stroke of the simulator piston 18. The described arrangements provide for an elastic stop. Hydraulic resistors or, respectively, throttling means (not shown) may be provided in the hydraulic connection 17 or the second hydraulic connection 23 in order to perform a damping function when the operating unit of the present invention is actuated.

The design of the second embodiment of the present invention illustrated in FIG. 3 basically corresponds to the facts explained with respect to FIG. 1. The third valve device which was mentioned in the preceding text and, in its open position, permits displacement of the pressure fluid from the first pressure chamber 4 into the hydraulic chamber 19 confined by the simulator piston 18 closes the first hydraulic connection 14 between the first pressure chamber 4 and the chamber 19 or, respectively, opens this connection in the embodiment shown. Although FIG. 3 depicts also a second hydraulic connection 23 between the simulator chamber 21 and the supply chamber 11 mentioned in connection with FIG. 1, another embodiment is feasible wherein there is no connection between the simulator chamber 21 and the supply chamber 11 so that the simulator chamber 21 remains 'dry'. To realize the above-mentioned elastic stop of the simulator piston 18', the simulator piston 18' in the illustrated embodiment has an axial extension 32 which can be moved into abutment on a pressure member 33 that abuts on an elastic element 34. Both the pressure member 33 and the elastic element 34 are arranged in a closure member 35 that closes the simulator chamber 21. The first hydraulic connection 14 is closed, similar to the embodiment of FIGS. 1 and 2, because a sealing sleeve 24' arranged at the second piston 3 overrides the mouth area of the connection 14.

Figure 4:
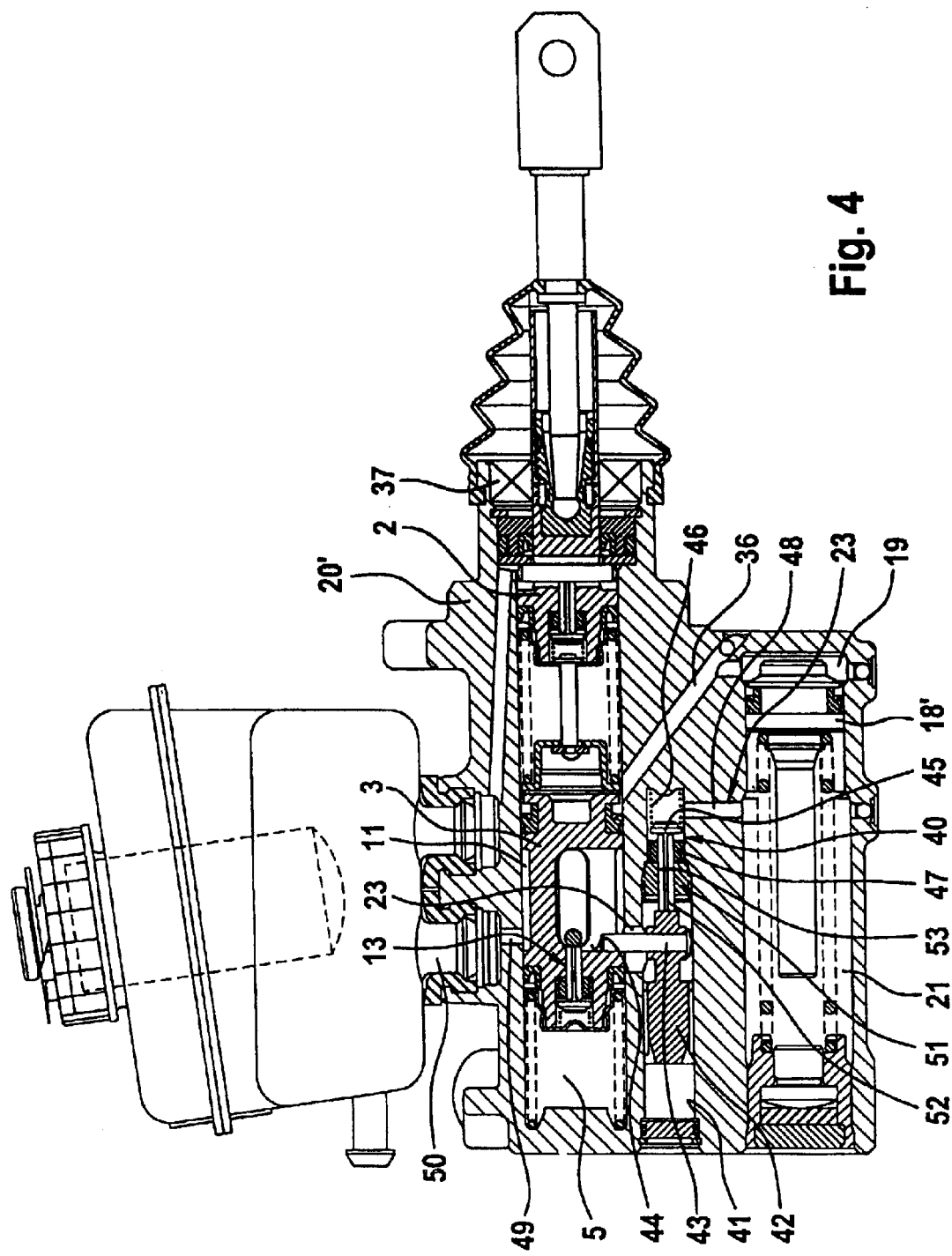
FIG. 4 is an illustration corresponding to FIG. 1 of a third design of the operating unit of the present invention.

The third embodiment of the present invention shown in FIG. 4 corresponds in terms of function to the first embodiment according to FIG. 1, wherein the third valve device closes or opens the hydraulic connection 23 between the simulator chamber 21 and the supply chamber 11. In this arrangement, the third valve device is configured as a seat valve 40 that is mechanically operable by a relative movement of the second piston 3 in relation to the housing 20'. For this purpose, a force-transmitting element 42 is guided in a bore 41 of the housing 20' that extends in parallel to the bore accommodating the two pistons 2, 3. Fastened in element 42 is a transverse member 43 that bears axially against an abutment surface 44 provided on the second piston 3. Under the bias of a valve spring 46, a valve member 45 is supported on the force-transmitting element 42 and, cooperating with a valve seat 47, is adapted to close the hydraulic connection 23 between the simulator chamber 21 and the pressure fluid supply reservoir 6 that leads via the supply chamber 11. As can be seen in FIG. 4, the hydraulic connection 23 is comprised of a bore 48 that extends from the simulator chamber 21, a part of the above-mentioned bore 41, and a channel 49 that is in connection to a reservoir port 50 associated with the second pressure chamber 5. The seat valve 40 is preferably so rated that the closure travel of its valve member 45 is larger than the closure travel of the central valve 13 arranged in the second piston 3. A guide ring 51, through which an axial extension 52 of the valve member 45 extends, is used to guide the valve member 45. The axial extension 52 includes radial ribs 53 to ensure a proper flow of the hydraulic pressure fluid between the simulator chamber 21 and the pressure fluid supply reservoir 6.

Figure 5:
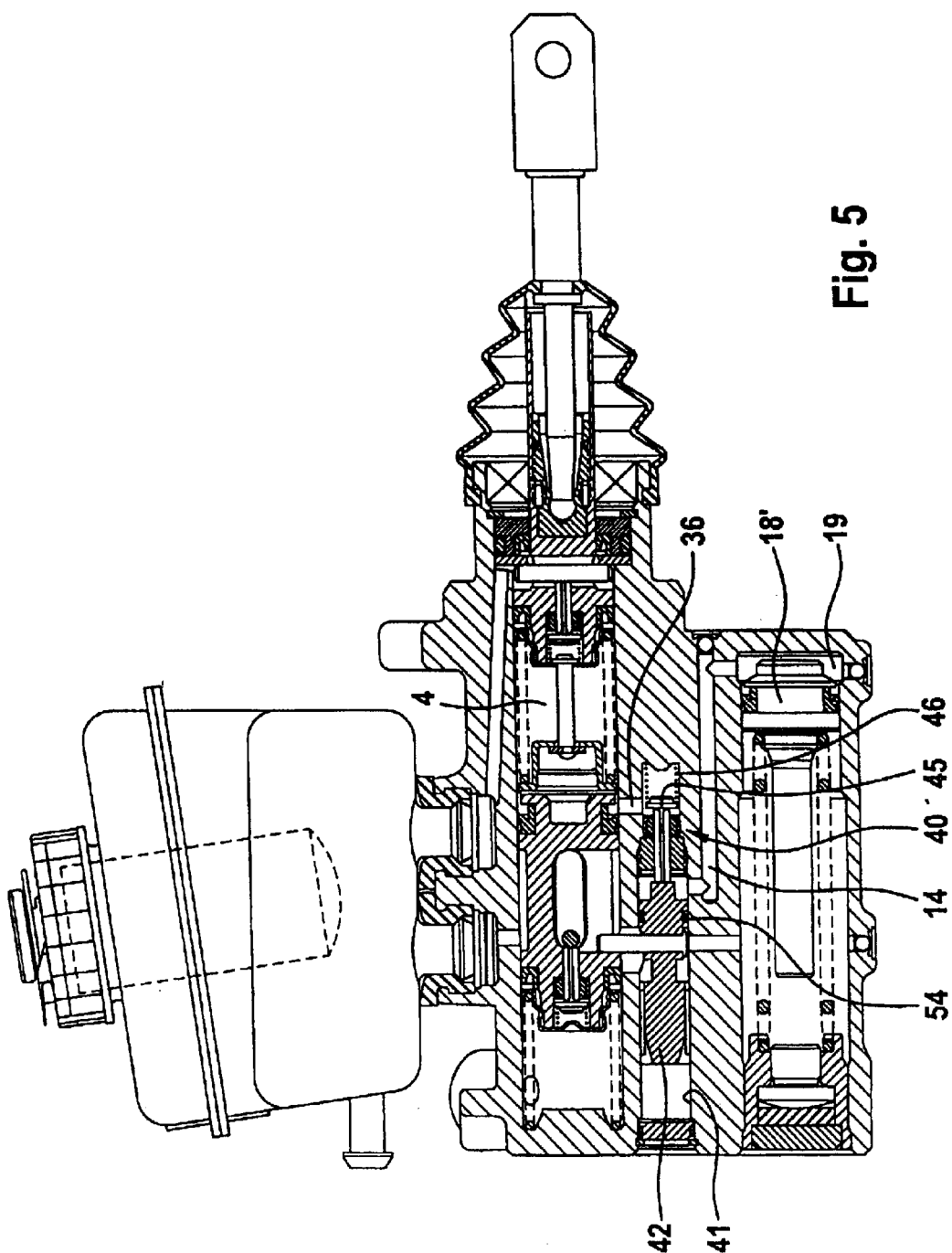
FIG. 5 is an illustration corresponding to FIG. 1 of a fourth design of the operating unit of the present invention.

Finally, the fourth embodiment of the present invention shown in FIG. 5, in terms of functioning, corresponds to the second embodiment according to FIG. 3, wherein the third valve device or the seat valve 40, respectively, closes or opens the hydraulic connection 14 between the first pressure chamber 4 and the hydraulic chamber 19 confined by the simulator piston 18'. The force-transmitting element 42 sealed and guided in bore 41 along with its sealing sleeve 54 forms a hydraulic effective surface which latter, in the open position of the seat valve 40, is acted upon by the pressure fluid flowing out of the first pressure chamber 4. This generates a force that assists the force of the valve spring 46 and, hence, closing of the seat valve 40. In all other respects, the mode of operation of this embodiment corresponds to the mode of operation of the second embodiment so that a more detailed explanation is not necessary.

As can be seen in the preceding description, it must be ensured that the above-mentioned connections are interrupted in the event of failure of the electronics controlling the electrohydraulic brake system. Otherwise, it would be impossible to build up braking pressure in the first pressure chamber 4 for the schematically illustrated brake circuit. When the operating unit of the present invention, especially illustrated in FIGS. 4 and 5, is actuated by depression of the brake pedal (not shown), the two pistons 2, 3 are moved in a known fashion to the left in the drawing, with the transverse member 43 under the bias of valve spring 46 following the second piston 3 until the valve member 45 moves into abutment on the sealing seat 47.

An important technical aspect in all brake systems of the 'brake-by-wire' type concerns the reliable detection of the driver's desire to decelerate. It has proven favorable in the course of developments that signals of systems or sensor assemblies that sense the actuating travel of the operating unit may be used for this purpose. The present invention therefore suggests arranging a travel measuring system 37 (only represented) in the entry area of the housing 20, 20', and the system's elements (not shown) that are responsible for the signal generation are mounted on the cylindrical surface of the first piston 2, while the signal pickup elements are integrated in the housing 20, 20'.

What is claimed is:

1. Operating unit for an electrohydraulic braking system, comprising:
    a first piston operable by an actuating pedal and biased by a first resetting spring,
    a second piston biased by a second resetting spring, wherein the pistons are arranged in tandem in a housing which includes first and second, delimiting pressure chambers that are in connection with an non-pressurized pressure fluid supply reservoir, said housing including hydraulic lines closable by a first and second valve devices being connected to said first and second, delimiting pressure chambers,
    a travel simulator which is provided by a simulator element delimiting a simulator chamber and cooperating with a simulator spring, wherein a pressure introduced into the first delimiting pressure chamber is applied by way of a hydraulic connection to said simulator element,
    a second hydraulic connection provided between said simulator chamber and the pressure fluid supply reservoir,
    a third valve device which closes or opens a hydraulic connection between the simulator chamber and the pressure fluid supply reservoir, wherein said third valve device is operable by a relative movement of the second piston in relation to the housing,
    wherein the simulator element is formed of a hydraulic simulator piston, and
    wherein the third valve device is formed of a seal arranged at the second piston and a mouth area of a channel provided in the range of movement of the seal, and
    wherein the second hydraulic connection opens into an annular groove such that the seal is capable of being mounted therein without tension in a radial direction.

2. Operating unit as claimed in claim 1, wherein hydraulic resistors or throttling means are provided in the hydraulic connection to said simulator element.

3. Operating unit as claimed in claim 1, wherein hydraulic resistors or throttling means are provided in the second hydraulic connection.

4. Operating unit as claimed in claim 1, wherein the seal is configured as a sealing sleeve.

5. Operating unit as claimed in claim 1, wherein the seal is configured as a sealing or O-ring.

6. Operating unit for an electrohydraulic braking system, comprising:
    a first piston operable by an actuating pedal and biased by a first resetting spring,
    a second piston biased by a second resetting spring, wherein the pistons are arranged in tandem in a housing which includes first and second, delimiting pressure chambers that are in connection with an non-pressurized pressure fluid supply reservoir, said housing including hydraulic lines closable by a first and second valve devices being connected to said pressure chambers,
    a travel simulator which is provided by a simulator element delimiting a simulator chamber and cooperating with a simulator spring, wherein a pressure introduced into the first delimiting pressure chamber is applied by way of a hydraulic connection to said simulator element,
    a third valve device which closes or opens the hydraulic connection and is operable by a relative movement of the second piston in relation to the housing,
    wherein the simulator element is formed of a hydraulic simulator piston, and
    wherein the third valve device is provided by a seal arranged at the second piston and a mouth area of a channel designed in the range of movement of the seal, said channel constituting the hydraulic connection and being connected to the first delimiting pressure chamber, and to a hydraulic chamber separated from the simulator chamber by the simulator piston, and
    wherein the hydraulic simulator piston includes an axial extension which is movable into engagement with an elastic stop.

7. Operating unit as claimed in claim 6, wherein a second hydraulic connection is provided between the simulator chamber and the pressure fluid supply reservoir.

8. Operating unit for an electrohydraulic brake-by-wire braking system, comprising:
    a first piston operable by an actuating pedal and biased by a first resetting spring
    a second piston biased by a second resetting spring, wherein said pistons are arranged in tandem in a housing, said housing including first and second, delimiting pressure chambers that are in connection with an non-pressurized pressure fluid supply reservoir, wherein said housing further includes hydraulic lines closable by a first and second valve devices being connected to said first and second, delimiting pressure chambers,
    a travel simulator which is provided by a simulator element delimiting a simulator chamber and cooperating with a simulator spring, a pressure introduced into said first delimited pressure chamber is applied by way of a hydraulic connection to said simulator element, wherein a second hydraulic connection is provided between the simulator chamber and the pressure fluid supply reservoir, and wherein the second hydraulic connection opens into an annular groove such that a seal arranged at the seconded piston is capable of being mounted therein without tension in a radial direction, and a third valve device which closes or opens the second hydraulic connection and is configured as a seat valve including a valve member that is biased in its closing direction by means of a valve spring and is operable by a relative movement of the second piston in relation to the housing, wherein the simulator element is formed of a hydraulic simulator piston, and wherein the seat valve is operable by means of a transverse member axially abutting on the second piston.

9. Operating unit for an electrohydraulic brake-by-wire braking system, comprising:

a first piston operable by an actuating pedal and biased by a first resetting spring, a second piston biased by a second resetting spring, wherein the pistons are arranged in tandem in a housing which includes first and second, delimiting pressure chambers that are in connection with a non-pressurized pressure fluid supply reservoir, said housing includes hydraulic lines closable by first and second valve devices being connected to said first and second, limiting pressure chambers, a travel simulator which is provided by a simulator element delimiting a simulator chamber and cooperating with a simulator spring, a pressure introduced into the first pressure chamber is applied by way of a hydraulic connection to said simulator element, a third valve device which closes or opens the hydraulic connection and is configured as a seat valve having a valve member that is biased into its closing direction by means of a valve spring and is operable by a relative movement of the second piston in relation to the housing, wherein the simulator element is formed of a hydraulic simulator piston, and in that the seat valve is operable by means of a transverse member axially abutting on the second piston, and wherein the hydraulic simulator piston includes an axial extension which is movable into engagement with an elastic stop.

10. Operating unit as claimed in claim 9, wherein the simulator piston includes an axial extension which is movable into engagement with tee elastic stop.

11. Operating unit as claimed in claim 9, wherein the elastic stop is arranged in the simulator piston and is movable into engagement with an axial stop element.

12. Operating unit as claimed in claim 9, wherein a second pressure chamber is in connection with the pressure fluid supply reservoir by an intermediary of a central valve arranged in the second piston, wherein a closure travel of the valve member is larger than the closure travel of the central valve.

13. Operating unit as claimed in claim 9, wherein the valve member is guided in a guide ring, and an axial extension which is used to guide the valve member includes axial ribs.

14. Operating unit as claimed in claim 9, wherein the transverse member cooperates with a force-transmitting element on which the axial extension is abutting and which represents a hydraulic effective surface that is acted upon by the pressure fluid flowing out of the first delimiting pressure chamber when the seat valve has adopted the open position.

15. Operating unit as claimed in claim 9, wherein the first piston is configured as a component of a travel-measuring system that senses the actuating travel and is integated in the housing.

16. Operating unit as claimed in claim 15, wherein a signal generator element of the travel-measuring system is mounted on a cylindrical surface of the first piston, and the travel-measuring system's signal pickup is arranged in the housing.

* * * * *

UNITED STATES PATENT AND TRADEMARK OFFICE
CERTIFICATE OF CORRECTION

PATENT NO. : 6,808,238 B2
DATED : October 26, 2004
INVENTOR(S) : Drott et al.

It is certified that error appears in the above-identified patent and that said Letters Patent is hereby corrected as shown below:

Column 8,
Line 8, please change "with tee elastic stop" to -- with the elastic stop --.
Line 31, please change "and is integated in the" to -- and is integrated in the --.

Signed and Sealed this

Twenty-sixth Day of April, 2005

JON W. DUDAS
*Director of the United States Patent and Trademark Office*